(12) United States Patent  
Lehmann

(10) Patent No.: US 7,039,973 B1  
(45) Date of Patent: May 9, 2006

(54) FISHING PLIERS WITH HOOK SHARPENING FILE

(76) Inventor: Roger W. Lehmann, 808 Ashley Ave., Brielle, NJ (US) 08730

( * ) Notice: Subject to any disclaimer, the term of this patent is extended or adjusted under 35 U.S.C. 154(b) by 99 days.

(21) Appl. No.: 10/802,588

(22) Filed: Mar. 17, 2004

(51) Int. Cl.
*B25B 13/02* (2006.01)

(52) U.S. Cl. .................. 7/106; 7/5.1; 7/5.4; 81/125; 81/127

(58) Field of Classification Search .............. 7/106, 7/5.1, 5.4; 81/125, 127, 132, 153, 106
See application file for complete search history.

(56) References Cited

U.S. PATENT DOCUMENTS

| | | | | |
|---|---|---|---|---|
| 1,902,913 A | * | 3/1933 | Sievern | 7/129 |
| 3,760,473 A | * | 9/1973 | Studdard | 407/29.1 |
| 5,497,522 A | * | 3/1996 | Chen | 7/128 |
| 5,963,999 A | * | 10/1999 | Gardiner et al. | 7/128 |
| 6,009,583 A | * | 1/2000 | Swanstrom, Jr. | 7/133 |
| 6,105,189 A | * | 8/2000 | Nabors et al. | 7/128 |
| 6,282,996 B1 | * | 9/2001 | Berg et al. | 81/427.5 |

* cited by examiner

*Primary Examiner*—Joseph J. Hail, III  
*Assistant Examiner*—Alvin J. Grant  
(74) *Attorney, Agent, or Firm*—Caesar, Rivise, Bernstein, Cohen & Pokotilow, Ltd.

(57) ABSTRACT

A pliers having a pair of jaws each of which has an outside surface and wherein at least one of the outside surfaces has a file that is a separate member that is releasably coupled to at least one of the outside surfaces. The file, or files, can be attached to either one or both of the jaws using a variety of coupling mechanisms.

3 Claims, 4 Drawing Sheets

FISHING PLIERS WITH HOOK SHARPENING FILE

BACKGROUND OF THE INVENTION

1. Field of Invention

This invention relates to fishing equipment and, more particularly, to pliers that are used to both remove fish hooks and sharpen them in one device.

2. Description of Related Art

One problem experienced by fishermen is to make certain that their fish hook has a very sharp point. In addition fish hooks, even new ones, require sharpening before use. Furthermore, hook points continue to become duller after catching a fish because the hook point is often times dulled from its penetration into the fish's mouth; especially if it contacts the bone structure of the fish's mouth. Fish hooks are required to have a very sharp point in order to provide penetration with the least amount of force; the absence of such sharp points is a contributing factor in not hooking the fish. The hook point must be finely sharpened to provide instant penetration of the hook into the fish upon its contact. A slightly blunt point dramatically increases the force necessary to penetrate the hook into the fish's mouth.

Another problem experienced by fisherman after catching the fish is the need to safely remove an embedded fish hook from the fish.

To resume fishing after a fish is caught, and the hook has safely been removed, it is highly recommended that the hook be re-sharpened before placing back into the water to resume fishing activities. The task of sharpening and re-sharpening hooks is often overlooked by many fishermen because the tools to do so are not readily available.

Pliers are available in many styles for the fisherman to safely grasp the embedded hook and remove it safely from the fish's mouth. Furthermore; in many cases the fisherman may have a pliers with him to remove the embedded fish hook, but seldom carries a file intended specifically to sharpen the fish hook, a very important function, as mentioned earlier, to continue the fisherman's success in catching fish.

The need to solve this problem becomes even more apparent in the excitement of catching fish—the fisherman does not perform the hook sharpening procedure because he doesn't have a file, or doesn't have one readily available.

Thus there remains a need to solve the problem by having a hook sharpening file as part of the pliers used to remove the fish hook. After the fish hook is safely removed by the fisherman, the same tool is readily available for allowing immediate hook sharpening, without the need for any other files or devices and without any further loss of time in the excitement of the fishing activity.

All references cited herein are incorporated herein by reference in their entireties.

BRIEF SUMMARY OF THE INVENTION

A pliers having a pair of jaws, each of which have an outside surface, and wherein at least one of the outside surfaces comprises a file.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention will be illustrated in more detail with reference to the following examples, but it should be understood that the present invention is not deemed to be limited thereto.

Figure 1:
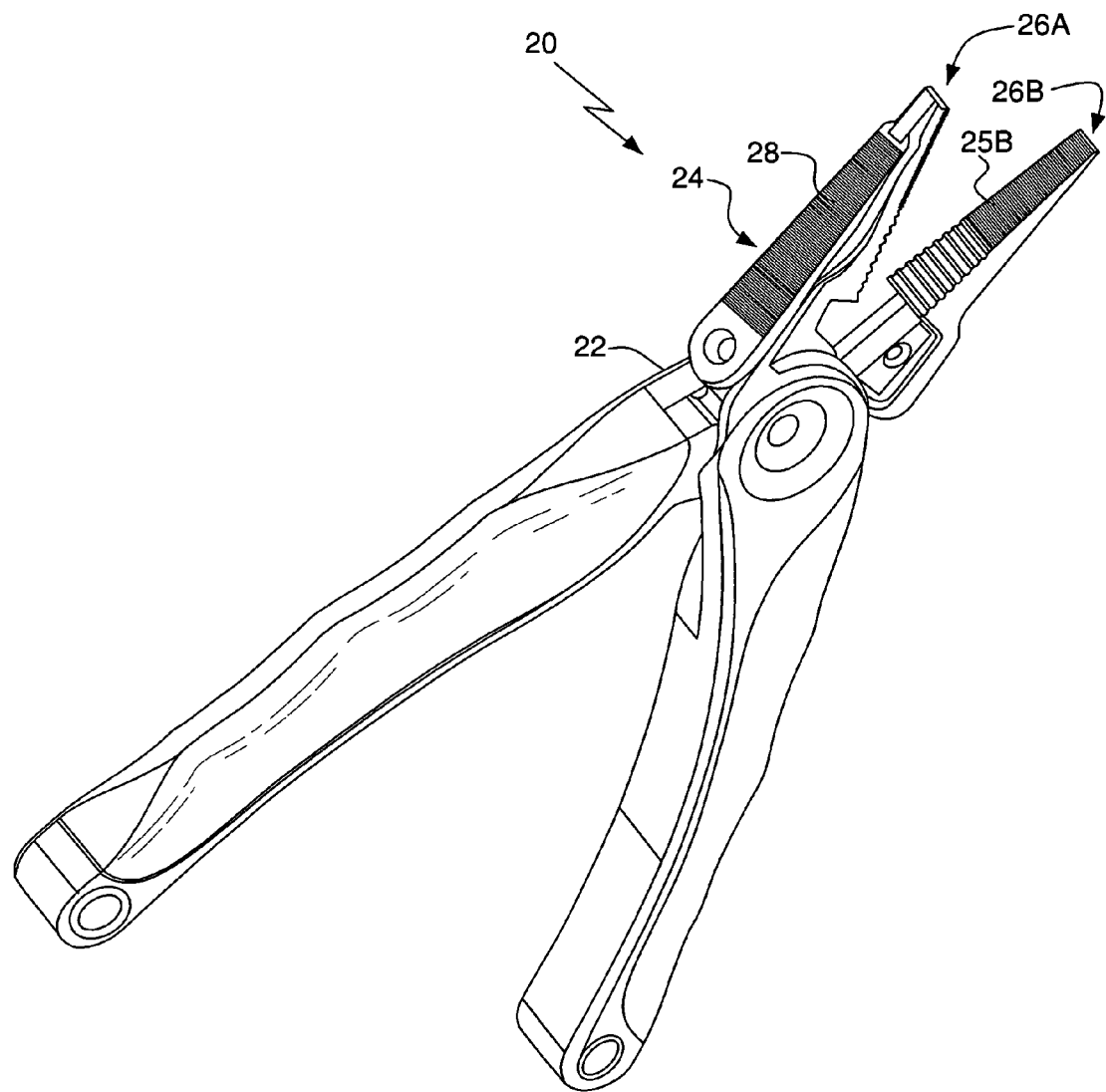
FIG. 1 is an isometric view of the pliers of the present invention showing the file on one of the pliers jaws.

There is shown in FIG. 1 the invention 20 comprising a pliers 22 and a file 24 that forms a portion of the outside surface of one jaw 26A of the pliers 22. Being located on the outside surface of one jaw, the file 24 does not interfere with normal pliers 22 operation; the inner or confronting jaw surfaces 25A/25B can close and grasp items (not shown) without the file 24 interfering. Once the fisherman is ready to sharpen the hook, he/she need only position the fish hook tip (not shown) against the file 24 and reciprocate the hook tip against the file surface 28, as one would normally do with a file.

The pliers 22 can be made of stainless steel that is treated to avoid rusting. The file 24 may comprise a hardened steel that is plated (e.g., with nickel) to allow the sharpening of the hook as well as to prevent rusting also. It should be understood that the material of both the pliers 22 and the file 24 does not limit the scope of the invention.

Figure 2:
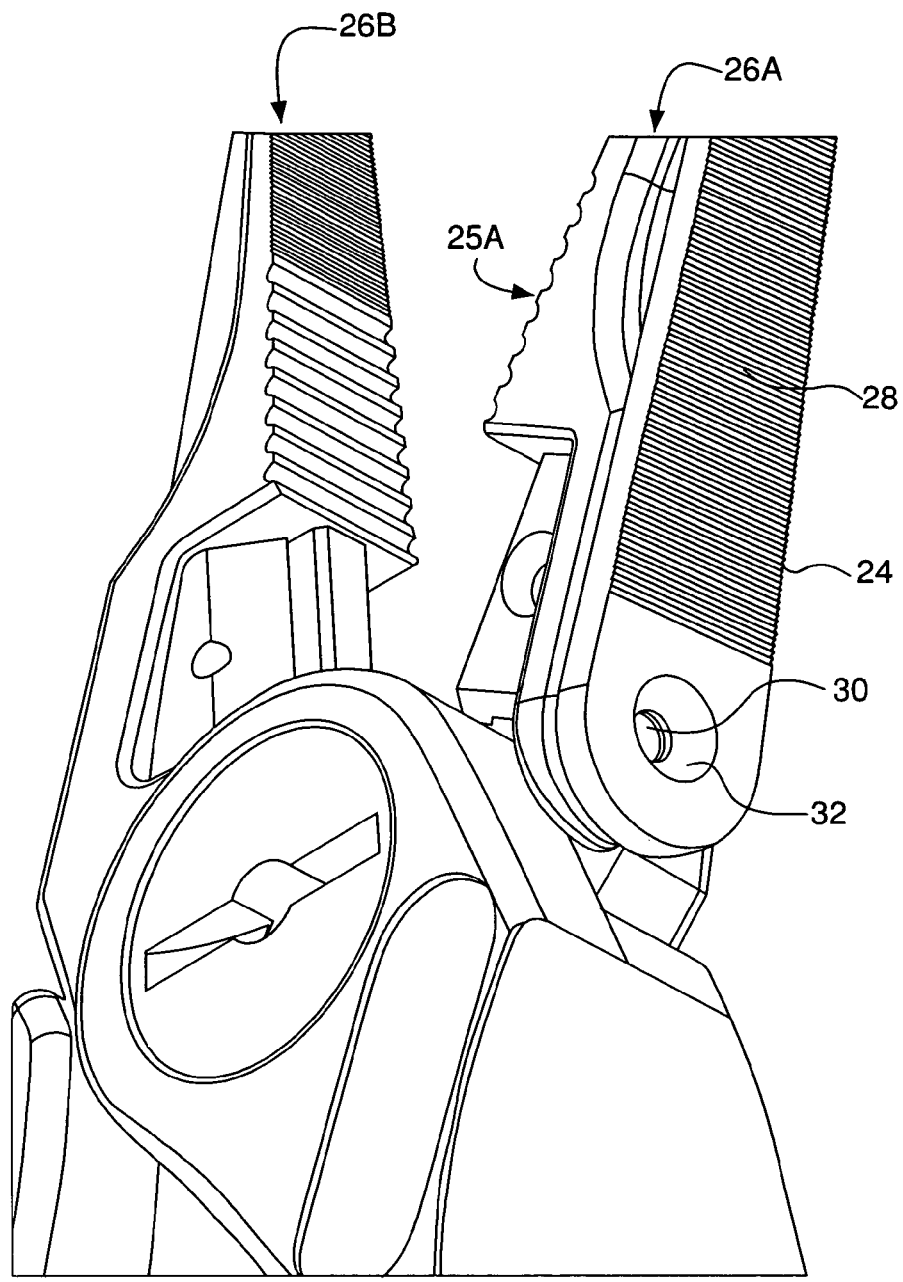
FIG. 2 is an enlarged partial view of the lower end of the file coupled to one of the pliers jaws.
Figure 3:
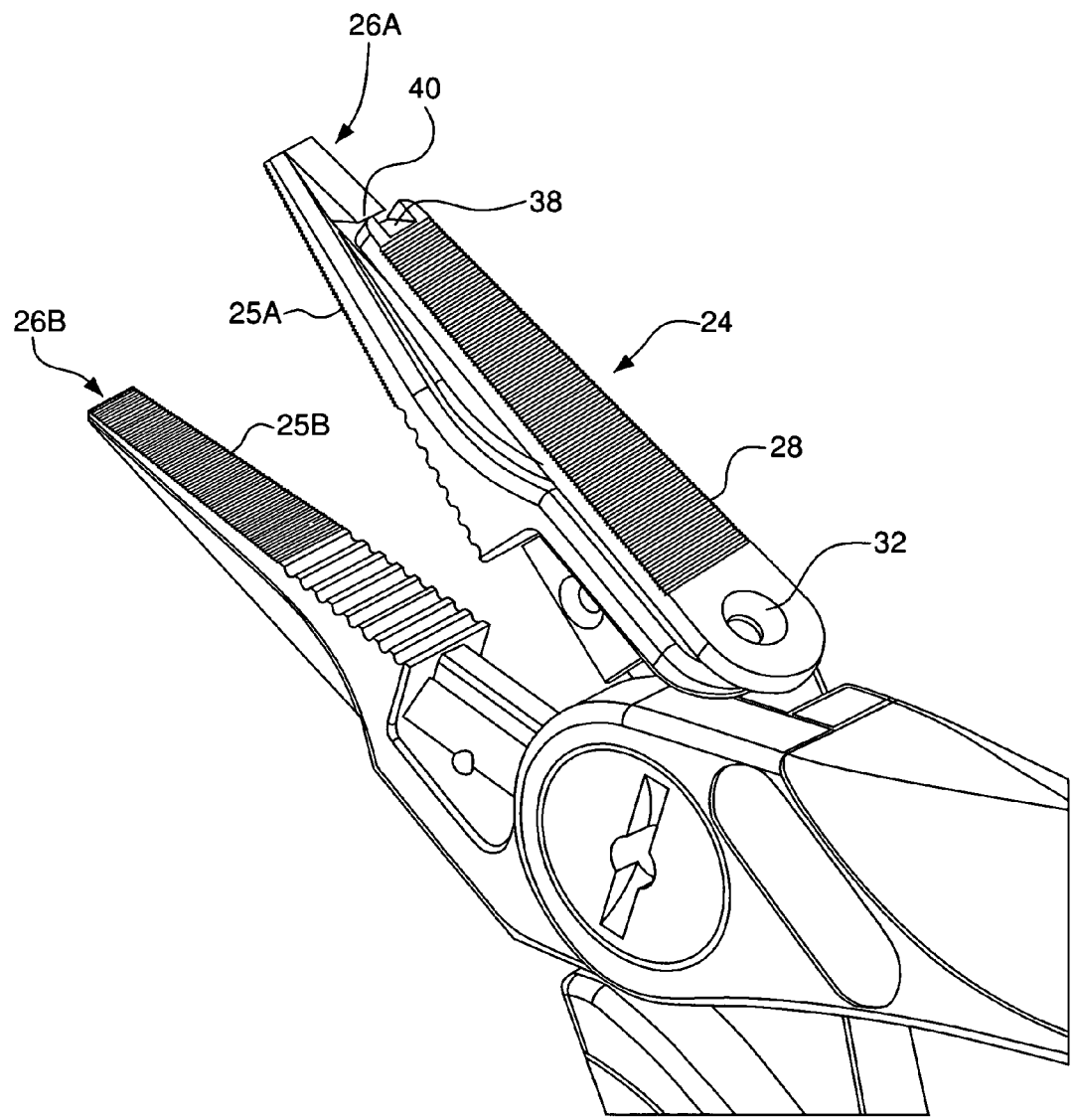
FIG. 3 is an enlarged exploded top view of the file and the pliers jaws.
Figure 4:
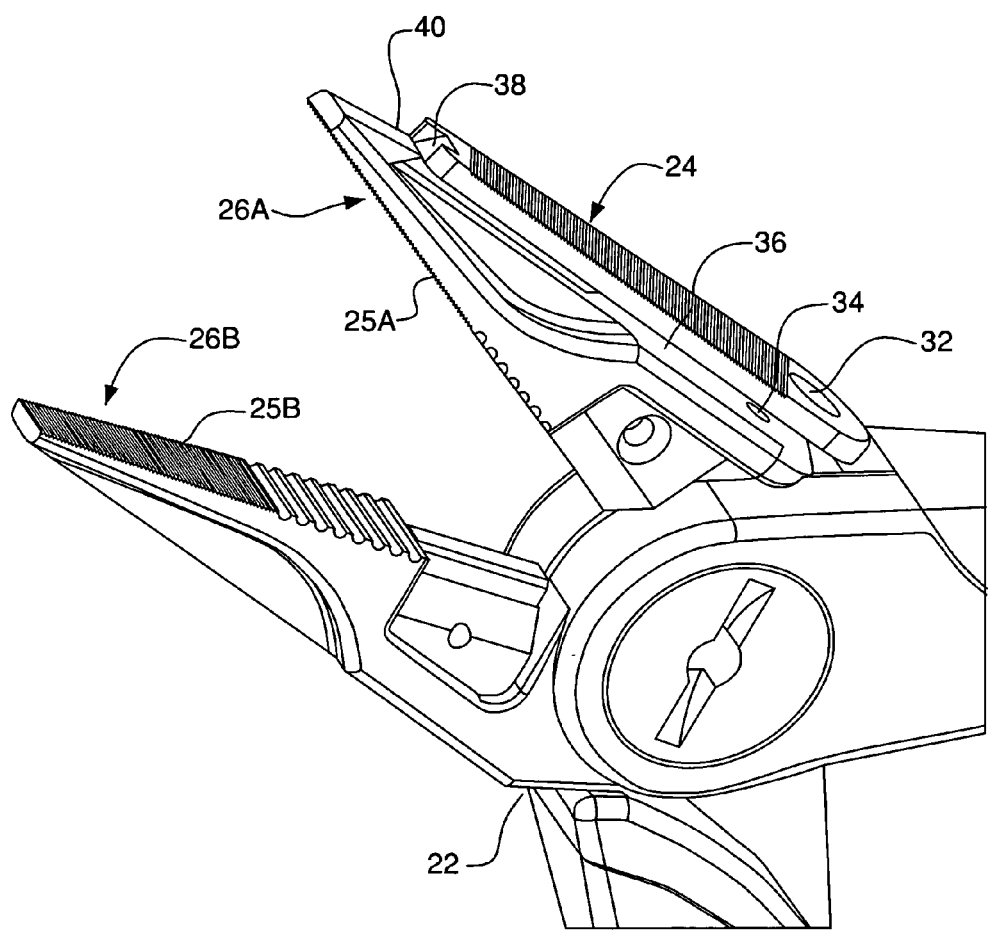
FIG. 4 is another enlarged exploded side view of the outer end of the pliers jaws.

By way of example only, the file 24 is coupled to the outside surface of the jaw 26A using a releasable securing means 30 (e.g., a screw, bolt, etc.) at one end and a tongue-in groove 32 (FIG. 3) at the other end. As shown most clearly in FIG. 2, one end of the file 24 is coupled to the jaw 26A by a releasable securing means 30. The releasable securing means 30 passes through a countersunk hole 32 (FIG. 3) in the file 24 and then into a threaded hole 34 (FIG. 4) in the outer surface 36 of the jaw 26A. The upper end of the file 24 comprises a groove 38 that fits underneath a tongue 40 at the distal end of the jaw 26A. Thus, to install and secure the file 24 to the pliers 22, the groove 38 in the upper end of the file 24 is slid under and against the tongue 40; next, the releasable securing means 30 is passed through the countersunk hole 32 and into the threaded hole 34 and tightened securely therein.

It should be understood that it is within the broadest scope of the present invention 20 to include the file 24 as integrated into the jaw 26A (or 26B) as a forged or machined part. As a result, during manufacture of the pliers 22 itself, the outside surface 36 of the jaw 26A can be formed such that the outer surface 36 of the jaw is the file 24. Thus, the scope of the present invention is not limited, in any way, by what is shown in FIGS. 1–4. Any known methods of securing the file 24 (e.g., welding, bonding, adhesive application, etc.), as a separate member, to the jaw of the pliers 22 is within the broadest scope of the invention; alternatively, any known methods of forming the outer surface 36 of the jaw into the file 24 during pliers 22 manufacturing is also within the broadest scope of the invention.

It should be further understood that although the figures depict having a file 24 on only one jaw 26A, it is within the broadest scope of the present invention to include a file 24 on, or as part of, the outside surface 36 of either or both jaws 26A/26B.

While the invention has been described in detail and with reference to specific examples thereof, it will be apparent to one skilled in the art that various changes and modifications can be made therein without departing from the spirit and scope thereof.

What is claimed is:

1. A pliers having a pair of jaws, each of which has an outside surface, wherein at least one of said outside surfaces comprises a file and wherein said file is a separate member that is releasably coupled to said at least one of said outside surfaces of at least one jaw.

2. The pliers of claim 1 wherein said at least one outside surface comprises an aperture at one end for receiving a releasable coupling means to releasably fasten one end of said file to said at least one of said outside surfaces of at least one jaw.

3. The pliers of claim 2 wherein said file comprises another end having a groove therein, said groove receiving a tongue positioned at another end of said at least one of said outside surfaces of said at least one jaw.

* * * * *

EX PARTE REEXAMINATION CERTIFICATE (6323rd)

United States Patent
Lehmann

(10) Number: US 7,039,973 C1
(45) Certificate Issued: Jul. 22, 2008

(54) FISHING PLIERS WITH HOOK SHARPENING FILE

(76) Inventor: Roger W. Lehmann, 808 Ashley Ave., Brielle, NJ (US) 08730

Reexamination Request:
No. 90/008,739, Jun. 20, 2007

Reexamination Certificate for:
Patent No.: 7,039,973
Issued: May 9, 2006
Appl. No.: 10/802,588
Filed: Mar. 17, 2004

(51) Int. Cl.
*B25B 13/02* (2006.01)

(52) U.S. Cl. .................. 7/106; 81/125; 81/127
(58) Field of Classification Search ............... None
See application file for complete search history.

(56) References Cited

U.S. PATENT DOCUMENTS

| 1,147,510 A | 7/1915 | Johnson |
| 1,172,569 A | 2/1916 | Sheafor |

FOREIGN PATENT DOCUMENTS

| JP | 57-189776 U | 12/1982 |
| JP | 58-132656 U | 9/1983 |
| JP | 07-20278 U | 4/1995 |

*Primary Examiner*—Catherine S. Williams

(57) ABSTRACT

A pliers having a pair of jaws each of which has an outside surface and wherein at least one of the outside surfaces has a file that is a separate member that is releasably coupled to at least one of the outside surfaces. The file, or files, can be attached to either one or both of the jaws using a variety of coupling mechanisms.

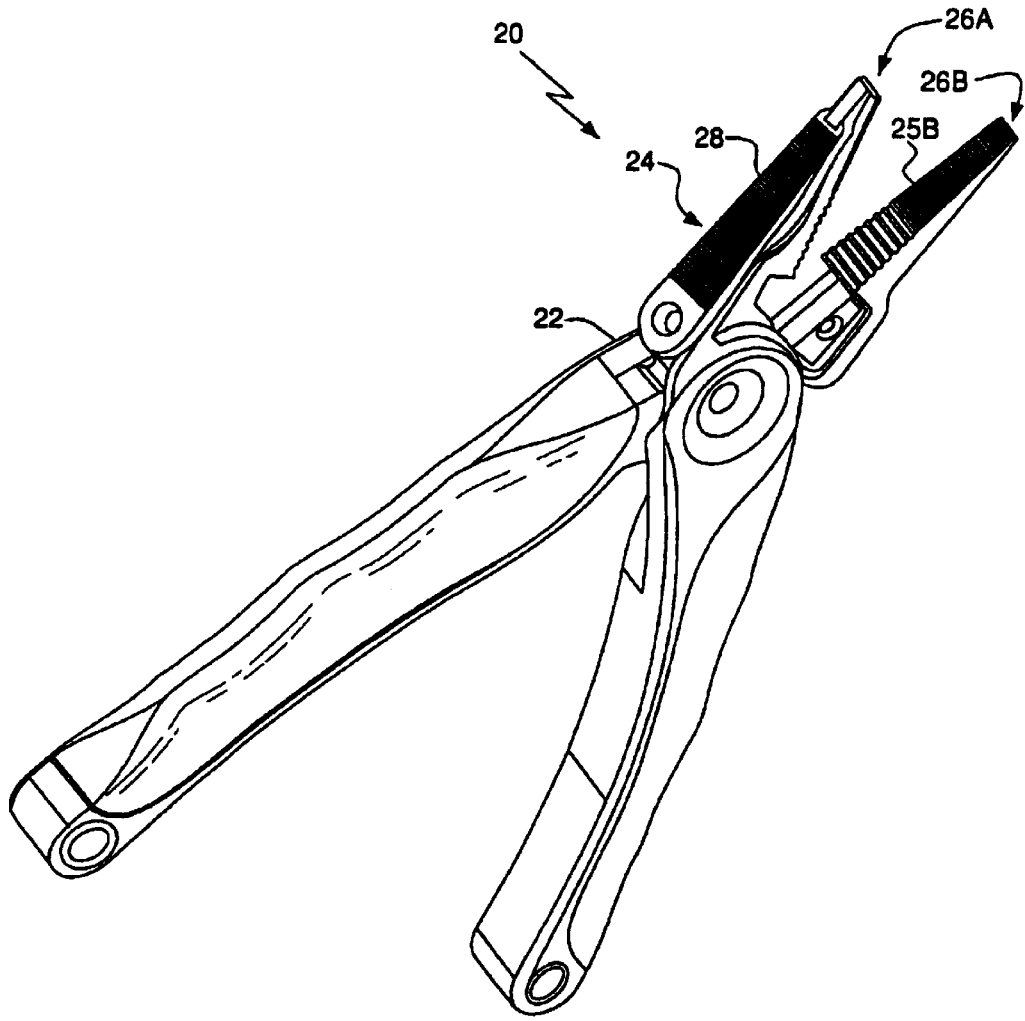

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–3 are cancelled.

* * * * *